(12) United States Patent
Evans et al.

(10) Patent No.: US 6,757,267 B1
(45) Date of Patent: Jun. 29, 2004

(54) ANTENNA DIVERSITY SYSTEM

(75) Inventors: David H. Evans, Crawley (GB); Kevin R. Boyle, Horsham (GB); Richard J. Caldwell, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/291,441

(22) Filed: Apr. 13, 1999

(30) Foreign Application Priority Data

Apr. 22, 1998 (GB) .............................................. 9808401
Jan. 28, 1999 (GB) .............................................. 9901789

(51) Int. Cl.$^7$ .............................. H04Q 7/00; H01Q 3/02
(52) U.S. Cl. .................... 370/334; 455/277.1; 455/562; 342/374; 343/834
(58) Field of Search ............................... 455/101, 103, 455/561, 562, 426, 65, 277.1; 343/725, 702, 728, 818, 83 L, 833, 834; 375/267; 370/334; 342/374

(56) References Cited

U.S. PATENT DOCUMENTS

| | | | | |
|---|---|---|---|---|
| 4,035,728 A | * | 7/1977 | Ishikawa et al. ............. | 455/134 |
| 4,290,071 A | * | 9/1981 | Fenwick ...................... | 343/819 |
| 4,700,197 A | * | 10/1987 | Milne .......................... | 343/837 |
| 4,764,740 A | * | 8/1988 | Meyer ......................... | 333/164 |
| 4,823,398 A | * | 4/1989 | Hashimoto .................. | 455/134 |
| 5,038,150 A | * | 8/1991 | Bains ........................... | 342/373 |
| 5,166,690 A | * | 11/1992 | Carlson et al. .............. | 342/157 |
| 5,241,701 A | * | 8/1993 | Andoh ......................... | 455/272 |
| 5,276,920 A | * | 1/1994 | Kuisma ....................... | 455/101 |
| 5,410,321 A | * | 4/1995 | Gordon et al. .............. | 342/374 |
| 5,680,142 A | | 10/1997 | Smith et al. ................. | 342/372 |
| 5,751,249 A | * | 5/1998 | Baltus et al. ................ | 342/372 |
| 5,767,807 A | * | 6/1998 | Pritchett ...................... | 342/374 |
| 5,818,543 A | * | 10/1998 | Lee .............................. | 348/725 |
| 6,055,422 A | * | 4/2000 | Saitoh ...................... | 455/277.1 |
| 6,167,286 A | * | 12/2000 | Ward et al. .................. | 455/562 |
| 6,256,495 B1 | * | 7/2001 | Francisco et al. ........... | 455/426 |
| 6,351,499 B1 | * | 2/2002 | Paulraj et al. ............... | 375/267 |
| 6,360,089 B1 | * | 3/2002 | Saitoh ......................... | 340/7.1 |

FOREIGN PATENT DOCUMENTS

| | | | | |
|---|---|---|---|---|
| EP | 0 680 161 A1 | * | 11/1995 | ............ H04B/7/08 |
| WO | WO9533312 | | 12/1995 | ............ H01Q/9/18 |
| WO | WO9708774 | | 3/1997 | ............ H01Q/9/18 |

* cited by examiner

*Primary Examiner*—Charles N. Appiah
(74) *Attorney, Agent, or Firm*—Dicran Halajian

(57) ABSTRACT

An antenna diversity system includes at least two antennas. Each antenna may be connected via a common connection point to a receiver by a respective switch which presents a low impedance connection between the antenna and receiver in the on state and a substantially reactive load to the antenna in the off state. Selection of appropriate impedances for the off state load enables the antennas to function as an array with a variety of beam patterns depending on the state of the switches. Cycling through a sequence of switch states steers the antenna beam providing improved resistance to fading and multipath effects. Alternatively, the antennas may be connected to a hybrid coupler, which enables two beam patterns to be available simultaneously for signal quality measurement and comparison.

9 Claims, 5 Drawing Sheets

ANTENNA DIVERSITY SYSTEM

FIELD OF THE INVENTION

The present invention relates to an antenna diversity system having a beam steering arrangement, and more particularly to an antenna diversity circuit, capable of generating a range of antenna beam patterns, and to a method of operating such a system. Applications of such a system include wireless data links in a business or domestic environment, and cordless and cellular telecommunications systems such as DECT (Digital Enhanced Cordless Telecommunications) and GSM (Global System for Mobile communication).

BACKGROUND OF THE INVENTION

For convenience of description the present invention will be described with reference to an antenna diversity system used with a receiver, however it should be understood that the invention is equally applicable to use with a transmitter owing to the reciprocity between transmitting and receiving antennas.

In a complex propagation environment such as within a building, signal fading is a common occurrence. The fading is caused by the mutual interference of multiple signals arriving along propagation paths of different lengths. If the interference is destructive the received signal strength may be reduced below the level required for adequate reception.

Within a building there is often a significant difference in the direction of propagation of the signals, with the result that a receiver having an antenna which can be directed towards a good signal while rejecting other signals will experience less severe fading and therefore enjoy better quality reception.

The propagation environment within a building is typically varying rapidly, for example because of the movement of people in the vicinity of the propagation paths. Hence, for the potential improvement offered by a directional antenna to be realised it must be able to be steered rapidly, which therefore requires electronic steering.

Adaptive antenna systems comprising a plurality of antennas are known. For example, published PCT Application WO 95/33312 discloses an arrangement for selecting two antennas from a plurality of directional antennas using two receivers. A first signal quality metric is measured for a communication signal received from a first antenna, and a second signal quality metric is measured for the communication signal received from a second antenna. When the difference between the first and second signal quality metrics exceeds a threshold a receiver is coupled to a third antenna and a third signal quality metric is measured. Based on the three metrics a primary and secondary antenna are selected from which to receive the communication signal. Steering is realised in this system by changing the selected directional antenna. However, such known systems have the disadvantage of requiring at least two complete receivers which makes them relatively expensive.

An example of an antenna diversity arrangement requiring only a single receiver is provided in our PCT application WO 97/08774 (PHB 34000) which provides a transceiver having two antennas and an arrangement for selecting the antenna providing the strongest received signal. While providing some benefits, such an arrangement makes no attempt to use the antenna which is not selected, and cannot selectively reject multipath signals.

SUMMARY OF THE INVENTION

An object of the present invention is to effect antenna diversity in a manner which selectively rejects multipath signals.

According to a first aspect of the present invention there is provided an antenna diversity system comprising at least two antennas, each of the at least two antennas being coupled to beam forming means, and control means for controlling the beam forming means to provide at least two alternative predetermined antenna beam patterns.

According to a second aspect of the present invention there is provided a method of operating an antenna diversity system comprising at least two antennas, each of the at least two antennas being coupled to beam forming means, and control means for controlling the beam forming means, the method comprising operating the control means to provide at least two alternative predetermined antenna beam patterns.

The present invention is based upon the recognition, not present in the prior art, that a variety of beam patterns can be formed by an antenna diversity arrangement comprising a plurality of antennas. Each beam pattern is produced by one or more of the antennas being connected to a transceiver while the remainder of the antennas are terminated by an appropriate impedance. Only a single transceiver is required.

BRIEF DESCRIPTION OF THE DRAWINGS

Embodiments of the present invention will now be described, by way of example, with reference to the accompanying drawings, wherein.

In the drawings the same reference numerals have been used to indicate corresponding features.

DETAILED DESCRIPTION OF THE INVENTION

Figure 1:
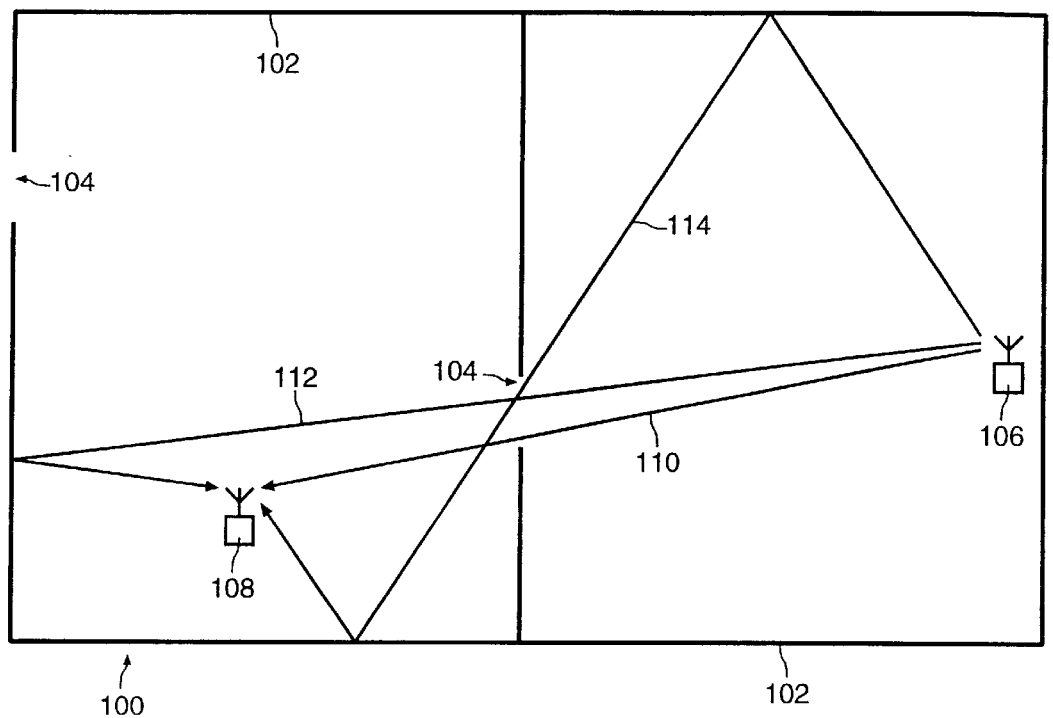
FIG. 1 illustrates a typical indoor multipath environment.

A simple indoor scenario is illustrated in FIG. 1. It comprises two rooms 100, each having walls 102 with doorways 104. A transmitter 106 is located in one room and a receiver 108 in the other room. Three possible signal paths between the transmitter 106 and receiver 108 through doorway 104 are shown: a first signal path 110 which is direct; a second signal path 112 which undergoes one reflection from a wall 102; and a third signal path 114 which undergoes two reflections from walls 102. In practice there will be a very large number of signal paths, having various numbers of reflections from walls 102 and transmissions through walls 102. As a result of such reflections and transmissions the signal strength at the receiver 108 will vary for different paths.

To avoid interference between the signals 110 to 114 it is desirable to have a directional antenna arrangement which selectively receives signals coming from a particular direction. Further, it is desirable to able to steer the directional antenna arrangement. For example, if the antenna is aimed to receive the direct signal 110 and that signal is blocked (for example by someone moving into the signal path 110), the antenna could be steered to receive an alternative signal 112, 114.

Figure 2:
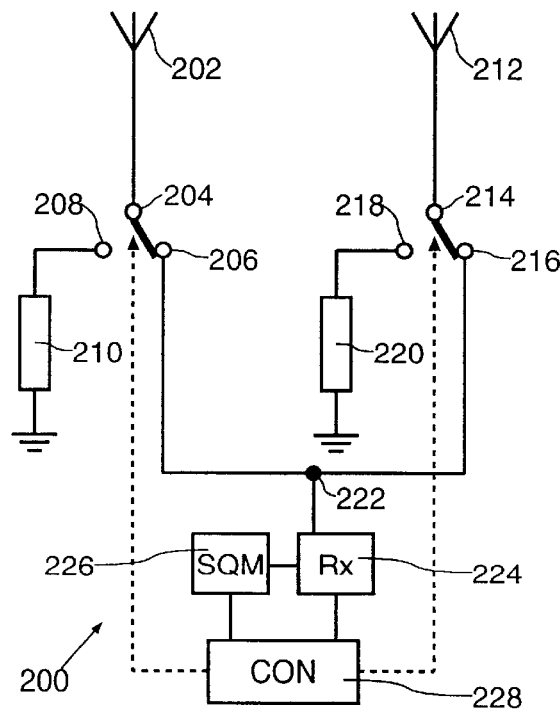
FIG. 2 is a schematic diagram of an antenna diversity system for use with two antennas.

FIG. 2 is a schematic diagram of an antenna diversity system 200 comprising first and second antennas 202, 212. The antennas are preferably substantially omni-directional, and may be of any convenient type, for example monopole, dipole or microstrip patch. Antennas 202 and 212 may be of identical or non-identical types. The first antenna 202 is connected to a first switch 204. In the on state the switch 204 routes the signal from the antenna 202 to a receiver (Rx) 224 via a first contact 206 and a common connection point 222. In the off state the switch 204 provides a termination 210 to the antenna via a second contact 206. The termination 210 is chosen to be a reflective termination, absorbing no power, and should therefore have a substantially reactive impedance. The second antenna 212 is connected similarly to a second switch 214, and from there either via a first contact 216 to the common connection point 222 or via a second contact 218 to a termination 220.

Signal quality measurement means (SQM) 226 are provided to enable detection of a fade or other problem with the received signal. Any convenient method can be used in the implementation of said means, for example detection of received radio signal strength or bit error rate. A controller 228 (CON) is provided to set the state of the switches 204, 214, in response to information from the receiver 224 and signal quality measurement means 226.

If both switches 204, 214 are in the on state, and if there are equal electrical lengths from the antennas 202, 212 to the common point 222, the radiation pattern will show a maximum response in the broadside direction, the antennas forming a two-element broadside array.

If the first switch 204 is on, connecting the first antenna 202 to the common connection point 222, while the second switch 214 is off, presenting a reflective termination 220 to the second antenna 212, the pair of antennas can be made to behave as an end-fire two element array. The first antenna 202, which is switched on, is the feed element of the array while the second antenna 212 behaves as either a director or a reflector, depending on the phase of the reflective termination 220. If the distance between the two antennas 202, 212 is chosen to be up to half of a wavelength at the frequency (or centre frequency) of interest then an end-fire configuration can be produced, with optimum results for a distance of a quarter of a wavelength. The end-fire configuration has a unidirectional pattern along the axis of the array. The direction of maximum gain depends on the phase of the reflective termination 220. If the termination 220 has a positive reactance this makes the second antenna 212 behave as a reflector, which in general is the preferred arrangement.

Reversing the first and second switches 204, 214 reverses the roles of the first and second antennas 202, 212, reversing the direction of maximum gain.

These three combinations of the first and second switches 204, 214 (on-on, on-off and off-on) allow the antennas 202, 212 to be operated in two end-fire and one broadside array configurations.

The general expression for the antenna pattern of an n-element linear antenna array is $$e = \sin nu/\sin u$$

where e is the gain of the antenna array, normalised to a maximum gain of unity, n is the number of antenna elements, and u is given by $$u = (d \cos \phi + a)/2$$

where d is the element separation (in wavelengths), a is the phase shift between elements at the frequency (or centre frequency) of interest, and $\phi$ is the angle measured clockwise relative to the axis of the array. For the broadside array pattern a=0, while for the end-fire array patterns a=±π/2.

The combination of two antennas in an array provides a 3 dB improvement in antenna gain compared to either a single antenna or to simple antenna space diversity (where the antenna providing the strongest signal is selected). However, the radio frequency (RF) circuitry is no more complicated than that required to implement antenna space diversity, as no additional phase shifting elements are required to cause the antenna beam to steer.

Figure 3A:
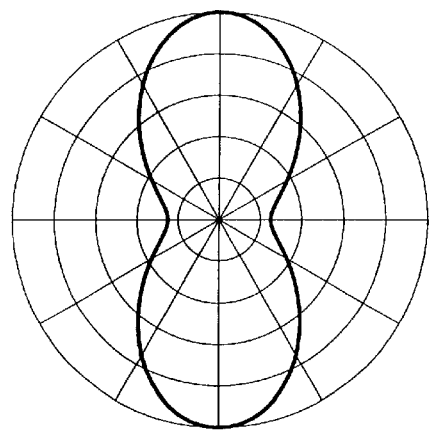
FIG. 3 is a graph of the antenna patterns of an antenna diversity system.
Figure 3B:
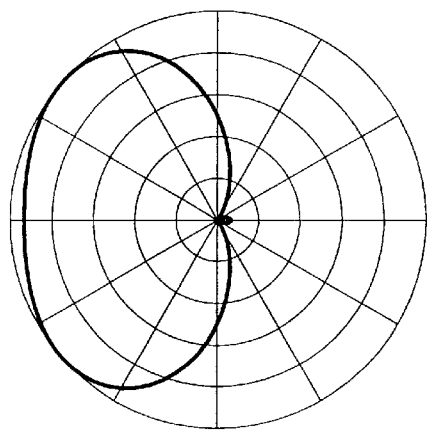
Figure 3C:
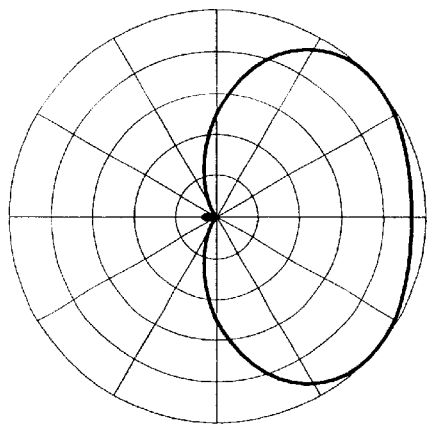

FIGS. 3A to 3C show polar plots of antenna response patterns produced by the three combinations of the switches 204, 214 for an arrangement where the two antennas are separated by a distance of a third of a wavelength. In all plots the axis of the array is along the x axis, i.e. from left to right on the page, with the first antenna 202 on the left and the second antenna 212 on the right. FIG. 3A shows the pattern when the switches 204, 214 are both on, which is a broadside pattern symmetrical about the x axis. FIG. 3B shows the pattern when the first switch 204 is on and the second switch 214 is off, which is an end-fire pattern with maximum gain in the negative x direction. Finally, FIG. 3C shows the pattern when the first switch 204 is off and the second switch 214 is on, which is an end-fire pattern with maximum gain in the positive x direction.

The gain differentiation between the antenna patterns is quite significant over a range of angles, which will be effective in providing an improvement in fading behaviour. An effective strategy to sweep the beam, moving the direction of maximum gain 90° at a time, is to drive the circuit so that it moves from end-fire left to broadside to end-fire right to broadside and so on. Such behaviour could be obtained by having a four-state circuit which cycles the state of the switches 204, 214 from on-off to on-on to off-on to on-on. On detection of a fade, the four-state circuit can be switched to its next state.

A variety of RF switches can be used. A switch should preferably have an on to off ratio of at least 15 dB, and the on-state loss should preferably be low. When off the switch should be reflective, i.e. it should be either a short or an open circuit or have any value of reactance with little or no resistive part. To make the second antenna behave as a reflector the appropriate termination phase can be achieved by a suitable network (for example a length of transmission line) between the antenna and the switch.

Suitable switches include PIN diodes and GaAs FET switches. Switching the gate bias to a low noise FET amplifier makes a good RF switch for this purpose. The inherent impedance mismatch caused by the FET when it is biased off forms a reflective termination. The idealised two-way switches 204, 214 shown in FIG. 2 are not necessary for a practical implementation.

Some applications may require an omnidirectional radiation pattern which cannot be achieved by any of the arrangements of switches described above, as shown by FIG. 3. Such a radiation pattern is however possible with minor modifications to the arrangement described above. In this modified circuit the second switch 214 has a third switch position in which the second antenna 212 is parasitically tuned to have no effect. When the second switch 214 is in this third position and the first switch 204 is in its first position, the first antenna 202 is connected to the receiver. In this configuration the antenna pattern is simply that of the first antenna 202 alone, which is preferably chosen to be omnidirectional.

Figure 4:
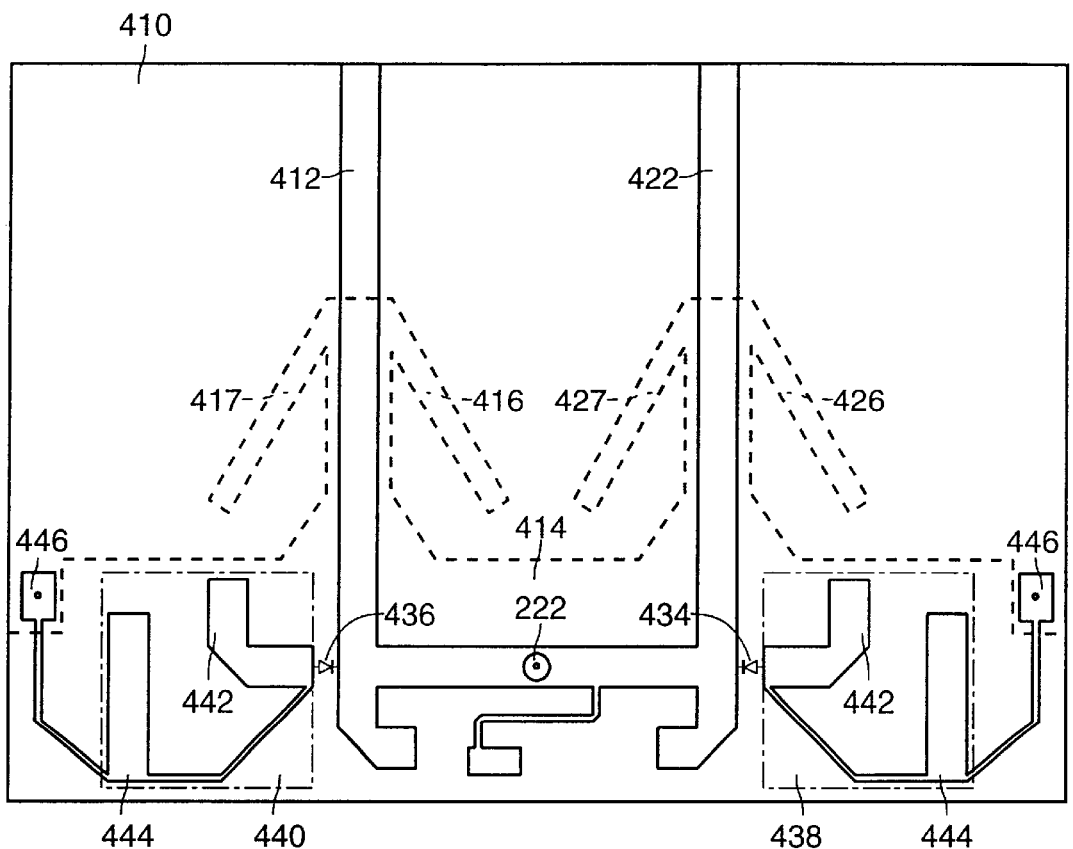
FIG. 4 is a diagram of an implementation of an antenna diversity circuit with two antennas.

An antenna diversity circuit according to the present invention is shown in FIG. 4, based on an arrangement disclosed in our PCT application WO 97/08774. It comprises a substrate 410 of, for example, Duroid or FR 4 glass fibre. On one side of the substrate 410 is provided a first elongate end-fed metallic dipole 412. In use it is intended that the dipole be arranged vertically such that the effective part of the dipole is the upper section having a length corresponding substantially to a quarter of the wavelength of the frequency (or centre frequency) of interest. The elongate dipole is formed in microstrip.

On the reverse side of the substrate 410, also formed in microstrip, is a ground plane 414 and a second dipole comprising first and second elements 416, 417 in microstrip which are connected to the ground plane 414 at a distance corresponding substantially to a quarter of a wavelength from the free end of the first dipole element and extend away therefrom. Each of the first and second elements 416, 417 has a length corresponding to a quarter wavelength of the frequency (or centre frequency) of interest. The first and second elements 416, 417 are inclined relative to the longitudinal axis of the first dipole element. The elements 414, 416, 417, 426, 427 on the reverse side of the substrate are drawn with dashed lines.

The dipole elements 412, 416, 417 form the first printed antenna. The second printed antenna is of the same type, with dipole elements 422, 426 and 427. The antennas are laid out on the substrate 410 such that the first dipole elements 412, 422 are separated by a distance corresponding to substantially one third of a wavelength of the frequency (or centre frequency) of interest. The feed lines of these two dipole elements are of the same width as the dipoles and comprise a 50 ohm line. A common feed point 222 is provided at substantially the mid-point of this line. The first and second elements 416, 417 and 426, 427 of the second dipole are on the opposite side of the substrate 410. PIN diodes 434, 436 are connected to the feed lines of the first dipole elements 412, 422 at a position remote from their main radiation region. These PIN diodes are also connected to respective low-pass filters 438, 440 comprising capacitive stubs 442, 444 which are coupled to terminals 446.

In use the common feed point 222 is connected to the input of a radio receiver 224, and a controller 228 is provided to set the energisation of the PIN diodes 434, 436. When a fade is detected by signal quality measurement means 226 the controller 228 changes the state of the PIN diodes as required to produce the next antenna pattern, for example acting as a four-state circuit as described above.

Measurements on a practical implementation of the antenna diversity circuit shown in FIG. 4, having an operating frequency of 5.8 GHz, gave results for antenna patterns in substantial agreement with the theoretical computations detailed above.

Figure 5:
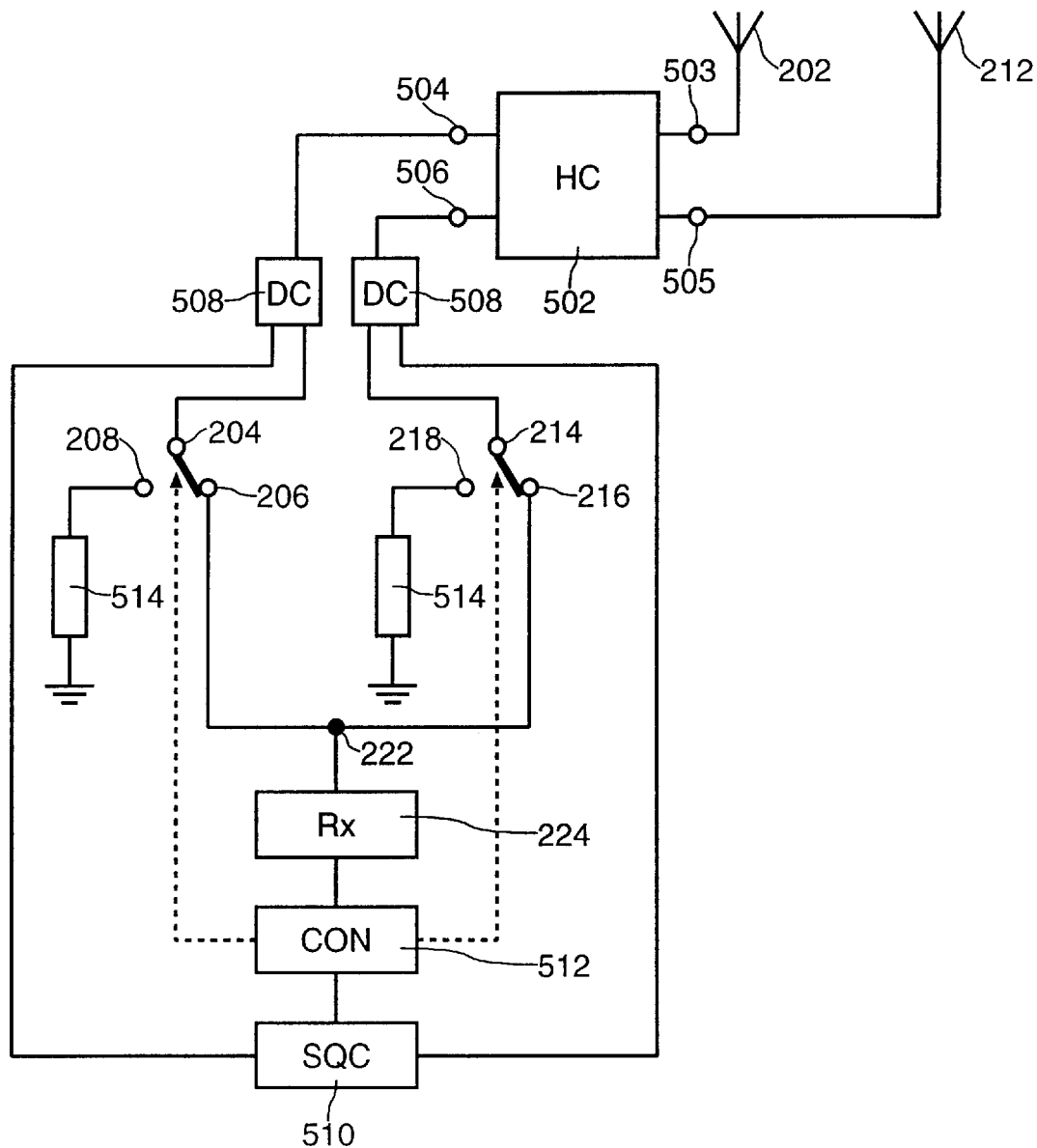
FIG. 5 is a schematic diagram of an antenna diversity system using a hybrid coupler.

A schematic diagram of an alternative embodiment of an antenna diversity system is shown in FIG. 5, in which two radiation patterns are available simultaneously. In this embodiment the first and second antennas 202, 212 are not connected directly to switches 204, 214 but instead are connected respectively to first and second inputs 503, 505 of a 90° hybrid coupler (HC) 502. An example of a suitable hybrid coupler for use in a DECT system is a Murata LDC30B030GC1900, which is sufficiently small to fit in any handset and has a loss of less than 1 dB.

A first output signal 504 from the hybrid coupler 502 provides a first beam signal that is the same as would be obtained from the first antenna 202 when the second antenna 212 has a reflective termination, because of the 90° phase shift applied by the hybrid coupler 502. A second output signal 506 from the hybrid coupler 502 provides a second beam signal that is the same as would be obtained from the second antenna 212 when the first antenna 202 has a reflective termination. Hence if antennas 202, 212 are omnidirectional and separated by a distance of a third of a wavelength, the antenna response patterns for the outputs 504, 506 are those illustrated in FIGS. 3B and 3C. Alternative response patterns could be generated using different antenna spacings and couplers having phase shifts different from 90°.

Two directional couplers (DC) 508 enable a sample of each output signal 504, 506 to be tapped off for use by a signal quality comparator (SQC) 510. The comparator 510 may for example comprise circuitry to measure the received radio signal strength of each signal, or some other suitable quality parameter such as bit error rate.

If required the directional couplers 508 could be replaced by switches. This alternative implementation has the disadvantage that the comparator 510 cannot compare signal qualities while the receiver 224 is receiving signals, but avoiding the use of directional couplers may be preferable in some applications.

A switching arrangement identical with that of FIG. 2, comprising switches 204, 214 as described above, may be used to select the output from one of the directional couplers 508 for connection to the common connection point 222 and receiver 224. A controller (CON) 512 sets the state of the switches 204, 214 in response to information from the receiver 224 and signal quality comparator 510. Differences from the arrangement of FIG. 2 are that only one of the switches 204, 214 can be on at a time, and the unused beam must be terminated in a matched load 514 (normally 50 ohms) for correct operation of the hybrid coupler 502.

Both the switching embodiment (of FIG. 2) and the hybrid coupler embodiment (of FIG. 5) are particularly suitable for use in Time Division Multiple Access (TDMA) systems such as DECT, in which signals are transmitted in time frames, each comprising a preamble and a data section. In such a system, signal quality measurements or comparisons can be performed during reception of the preamble in a frame enabling the best beam pattern to be selected for reception of the data section.

Such implementations also allow use at high velocity, by reducing the time delay between signal measurement and implementation of diversity switching. This enables the switching to be performed on a per-frame basis, avoiding the need to attempt to determine the temporal fading characteristics of the received signal.

A further advantage is that the directionality of the two beams reduces the delay spread in the received signals, thereby reducing inter-symbol interference and making it possible to achieve higher data rates.

Both the switching and hybrid coupler embodiments are also suitable for transmission, in which case the receiver 224 is replaced by a transceiver. The beam last selected for reception could be used for transmission, taking advantage of the symmetry of the radiation channel in a time division duplex system. The transmitted signal will have the advantage of a 3 dB directive gain over that of a single omnidirectional antenna, thereby giving enhanced coverage.

In a frequency division duplex system the radiation channel may not be symmetric, depending on the frequency difference between uplink and downlink transmissions and other characteristics of the radio propagation environment. It may therefore be better simply to use an omnidirectional beam pattern for transmission in some circumstances.

A disadvantage of the hybrid coupler embodiment of FIG. 5 is that 3 dB of power is dissipated by the load 514 on the unused output of the hybrid coupler 502 during reception. However, the performance is no worse than that with a single omnidirectional antenna, because of the directive gain in each beam of approximately 3 dB.

Figure 6:
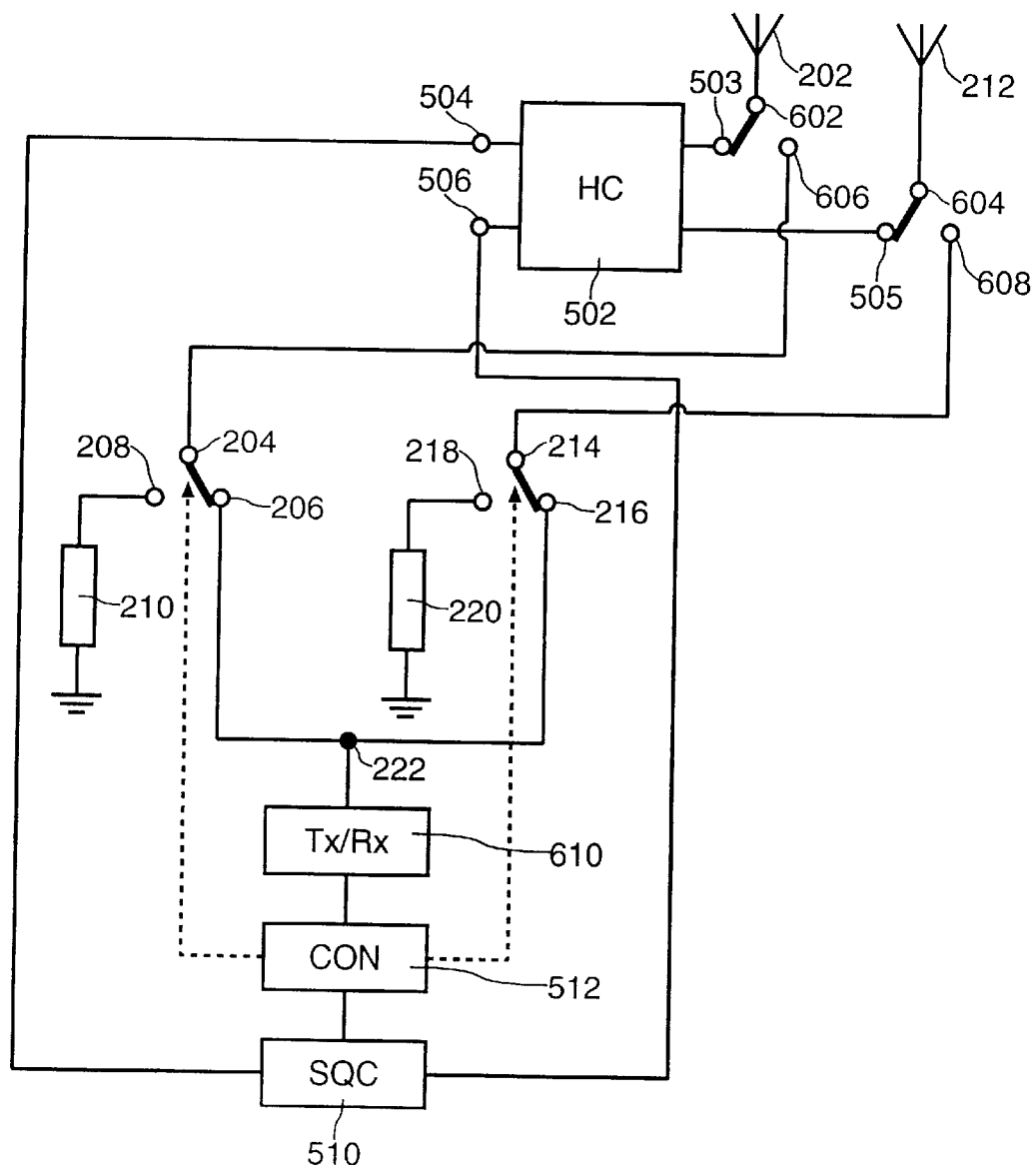
FIG. 6 is a schematic diagram of an antenna diversity system using a hybrid coupler for signal quality measurement only.

FIG. 6 illustrates a second hybrid coupler embodiment which alleviates this problem. The embodiment is similar to that of FIG. 5, but instead of the antennas 202, 212 being connected directly to the respective inputs 503, 505 of the hybrid coupler 502 they are connected to switches 602, 604. For sampling and comparison of the quality of received signals the switches 602, 604 connect the antennas 202, 212 to the inputs 503, 505 of the hybrid coupler 502, whose outputs 504, 506 are connected directly to the signal quality comparator 510.

For normal reception and transmission the switches connect the antennas 202, 212 to terminals 606, 608 which connect directly to switches 204, 214, bypassing the hybrid coupler 502. The remainder of the circuit operates in the same way as the switching embodiment of FIG. 2 described above, with a transceiver (Tx/Rx) 610 in place of the receiver 224. The settings of the switches 204, 214 are determined from measurements made by the comparator 510 when connected to the outputs 504, 506 of the hybrid coupler 502.

If it is desired to have continuous comparison of received signal quality from the different beams, the switches 602, 604 can be replaced by directional couplers 508.

Figure 7:
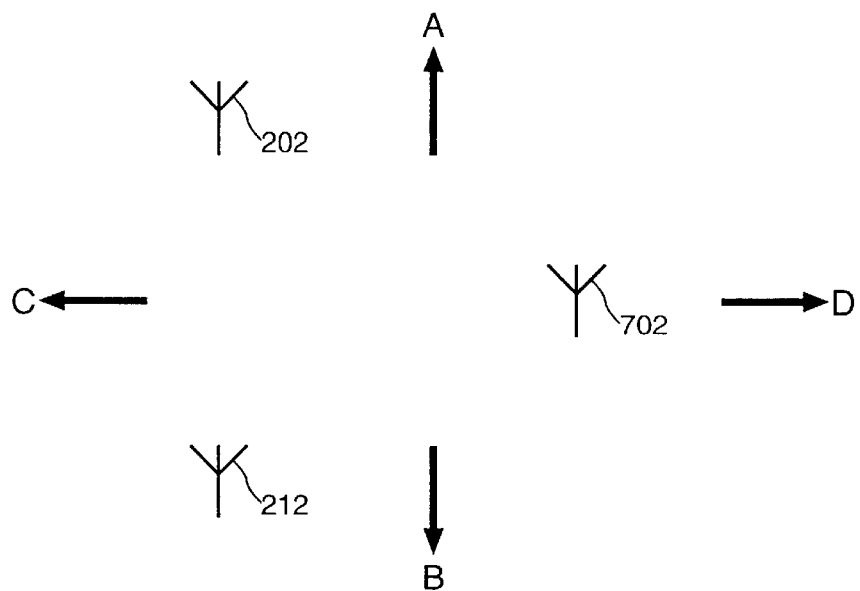
FIG. 7 is a diagram of an antenna diversity system with three antennas.

The method in accordance with the present invention could also be applied to antenna diversity systems having more than two antennas. For example, one problem with the two antenna arrangement detailed above is that the broadside pattern, shown in FIG. 3A, is symmetrical about the axis of the array. FIG. 7 is a plan view of one possible arrangement of three antennas that overcomes this limitation. The arrangement comprises a first antenna 202 and a second antenna 212, separated by a maximum distance of a half of a wavelength at the frequency (or centre frequency) of interest, together with a third antenna 702, halfway between the first and second antennas 202, 212 but separated laterally by a maximum distance of a half of a wavelength at the frequency (or centre frequency) of interest.

This arrangement retains the end-fire capability, in directions A and B, of the two antenna array, while adding the ability to generate antenna patterns in directions C and D.

It will be apparent to those skilled in the art, by using the teachings in accordance with the present invention, that the addition of further antennas would enable the generation of a greater number of directional antenna patterns.

Although the antenna diversity system was described above in relation to use with a receiver, it will be apparent that it could equally well be used with a transmitter. For example, in a two way cordless communication system, such as DECT or GSM, the antenna beam pattern which is optimum for reception of signals at a handset from a base station will also, by reciprocity, be optimum for transmission of signals from the handset to the base station.

From reading the present disclosure, other modifications will be apparent to persons skilled in the art. Such modifications may involve other features which are already known in antenna diversity systems and methods of operating such systems, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. An antenna diversity system comprising at least two antennas, each of the at least two antennas being coupled to beam forming means, and control means for controlling the beam forming means to provide at least two alternative predetermined antenna beam patterns; wherein the beam forming means comprises a respective switching means coupled to each antenna, and each switching means has an on to off ratio of at least 15 dB and provides a substantially reflective termination to its respective antenna in an off state.

2. An antenna diversity system as claimed in claim 1, characterised in that the system further comprises signal quality measurement means to determine the quality of the received signal, and in that the control means controls the beam forming means in response to output from the signal quality measurement means to provide an antenna beam pattern for improving the received or transmitted signal characteristics.

3. An antenna diversity system as claimed in claim 1 characterised in that the beam forming means comprises a hybrid coupler.

4. An antenna diversity system as claimed in claim 1, wherein each switching means has an on state in which its respective antenna is coupled to a common connection point and an off state in which it provides an appropriate termination to the antenna.

5. An antenna diversity system as claimed in claim 1, wherein in each state provided by the control means one or more of the switching means are on and the remainder are off.

6. An antenna diversity system as claimed in claim 1, wherein the switching means are semiconductor switching devices.

7. A method of operating an antenna diversity system comprising at least two antennas, each of the at least two antennas being coupled to beam forming means, and control means for controlling the beam forming means, the method comprising operating the control means to provide at least two alternative predetermined antenna beam patterns; wherein the beam forming means comprises a respective switching means coupled to each antenna, and each switching means has an on to off ratio of at least 15 dP and provides a substantially reflective termination to its respective antenna in an off state.

8. A method of operating a antenna diversity system as claimed in claim 7 characterised in that the system further comprises signal quality measurement means to determine the quality of the received signal, and in that the method further comprises operating the control means in response to output from the signal quality measurement means to provide an antenna beam pattern for improving the received or transmitted signal characteristics.

9. An antenna diversity system comprising:
   at least two antennas;
   at least two switches;
   a beam former coupled to said at least two antennas through respective ones of said at least two switches; and
   a controller which controls the beam former to provide at least two alternative predetermined antenna beam patterns;
   wherein each of said at least two switched has an on to off ratio of at least 15 dB and provides a substantially reflective termination to its respective antenna in an off state.

* * * * *